(12) United States Patent
Karighattam et al.

(10) Patent No.: US 9,960,909 B2
(45) Date of Patent: May 1, 2018

(54) HIGH SPEED AND LOW POWER HASHING SYSTEM AND METHOD

(71) Applicant: OPEN-SILICON INC., Milpitas, CA (US)

(72) Inventors: Vasan Karighattam, Milpitas, CA (US); Devendra Godbole, Pune (IN)

(73) Assignee: OPEN-SILICON INC., Milpitas, CA (US)

( * ) Notice: Subject to any disclaimer, the term of this patent is extended or adjusted under 35 U.S.C. 154(b) by 167 days.

(21) Appl. No.: 14/563,838

(22) Filed: Dec. 8, 2014

(65) Prior Publication Data

US 2016/0164672 A1 Jun. 9, 2016

(51) Int. Cl.
*H04K 1/00* (2006.01)
*H04L 9/06* (2006.01)

(52) U.S. Cl.
CPC .................. *H04L 9/0643* (2013.01)

(58) Field of Classification Search
CPC ............... H04L 9/0643; G06F 12/0811; G06F 9/30065; G06F 9/3826; G06F 9/3867; G06F 9/3869
See application file for complete search history.

(56) References Cited

U.S. PATENT DOCUMENTS

| | | | |
|---|---|---|---|
| 6,314,186 B1 | 11/2001 | Lee et al. | |
| 6,829,355 B2 | 12/2004 | Lily | |
| 6,865,272 B2 | 3/2005 | Cole | |
| 7,092,525 B2 | 8/2006 | Matchett et al. | |
| 7,213,148 B2 | 5/2007 | Anand | |
| 7,248,691 B1 | 7/2007 | Pandit et al. | |
| 7,249,255 B2 | 7/2007 | Anand | |
| 7,266,703 B2 | 9/2007 | Anand et al. | |
| 7,570,760 B1 | 8/2009 | Olson et al. | |
| 7,620,821 B1 | 11/2009 | Grohoski et al. | |
| 7,680,087 B2 | 3/2010 | Chen et al. | |
| 7,882,351 B2 | 2/2011 | Serret-Avila | |

(Continued)

OTHER PUBLICATIONS

Courtois et al. Optimizing SHA256 in Bitcoin Mining. 2014. University College London, UK. CCIS. pp. 131-144.*

(Continued)

*Primary Examiner* — Alexander Lagor
*Assistant Examiner* — Abdullah Almamun
(74) *Attorney, Agent, or Firm* — Ohlandt, Greeley, Ruggiero & Perle, LLP

(57) ABSTRACT

A system for performing hashing includes a controller for controlling the system and for providing a clock signal; an array of integrated circuits; in each integrated circuit, a plurality of cores for performing hashing; and in each core, a plurality of data expanders and data compressors, the data expanders and the data compressors having pipelined circuitry so that two iterations of a hashing loop are performed for each cycle of the clock signal. A method for performing hashing, includes controlling a system having an array of integrated circuits with a clock signal; performing hashing in a plurality of cores in each integrated circuit; and performing for each cycle of the clock signal, in each core, a plurality of data expansion and data compression operations, using pipelined circuitry so that two iterations of a hashing loop are performed for each cycle of the clock signal.

18 Claims, 10 Drawing Sheets

(56) References Cited

U.S. PATENT DOCUMENTS

| | | |
|---|---|---|
| 7,885,405 B1 | 2/2011 | Bong |
| 7,933,404 B2 | 4/2011 | Venkatesan et al. |
| 7,962,753 B2 | 6/2011 | Satou |
| 8,086,864 B2 | 12/2011 | Kim et al. |
| 8,160,242 B2 | 4/2012 | Grinchuk et al. |
| 8,165,287 B2 | 4/2012 | Ghouti et al. |
| 8,184,803 B2 | 5/2012 | Ghouti et al. |
| 8,275,125 B2 | 9/2012 | Vijayarangan |
| 8,290,147 B2 | 10/2012 | Orlando et al. |
| 8,428,251 B2 | 4/2013 | Ciet et al. |
| 8,503,679 B2 | 8/2013 | Bugbee |
| 8,583,902 B2 | 11/2013 | Olson et al. |
| 8,738,860 B1 * | 5/2014 | Griffin et al. ....... G06F 12/0897 711/122 |
| 2002/0191791 A1 * | 12/2002 | Anand ................ H04L 9/0643 380/255 |
| 2002/0191792 A1 * | 12/2002 | Anand ................ H04L 9/0643 380/255 |
| 2006/0095732 A1 * | 5/2006 | Tran et al. ............ G06F 9/3826 712/217 |
| 2006/0095750 A1 * | 5/2006 | Nye et al. ............. G06F 9/3848 712/240 |
| 2012/0201373 A1 | 8/2012 | Hua et al. |
| 2013/0212352 A1 * | 8/2013 | Anderson ............. G06F 9/3869 712/1 |
| 2014/0093069 A1 * | 4/2014 | Wolrich et al. .......... G09C 1/00 380/28 |
| 2015/0043729 A1 * | 2/2015 | Gopal et al. .......... H04L 9/0643 380/29 |
| 2016/0112200 A1 * | 4/2016 | Kheterpal et al. .... H04L 9/0643 380/28 |
| 2017/0242475 A1 * | 8/2017 | Gilboa et al. ......... G06F 1/3287 |

OTHER PUBLICATIONS

Macchetti, et al.; "Quasi-Piplined Hash Circuits", Proceedings of the 17th IEEE Symposium on Computer Arithmetic (ARITH'055): 8 pages.

* cited by examiner

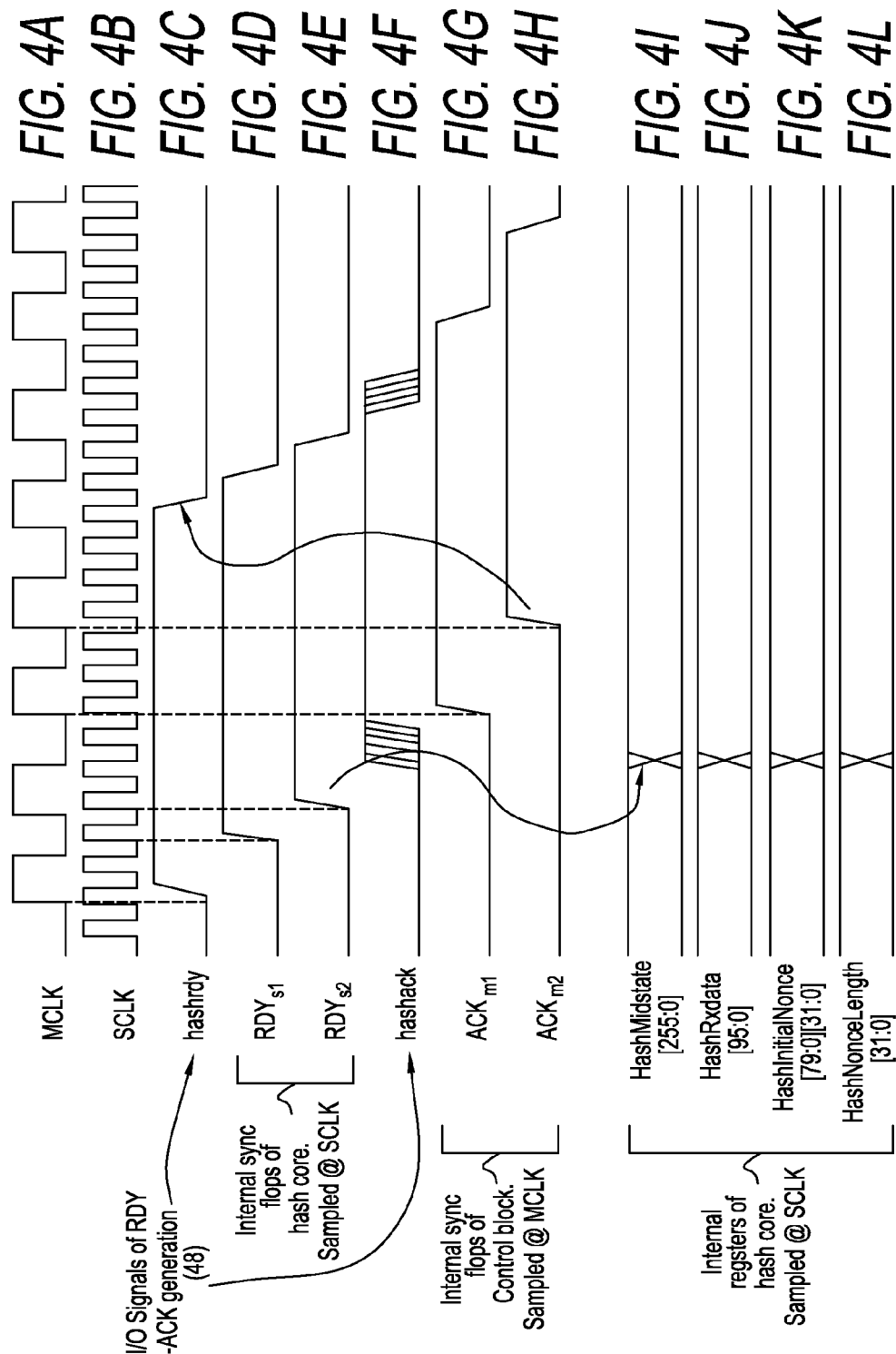

HIGH SPEED AND LOW POWER HASHING SYSTEM AND METHOD

BACKGROUND OF THE DISCLOSURE

1. Field of the Disclosure

The present disclosure relates to systems for performing hashing at very high speeds. Systems of the type disclosed have applicability to a variety of tasks, but are well suited for the performance of Bitcoin mining.

2. Description of the Related Art

Bitcoin has been described as including a mix of three monetary processes. Bitcoin handles its own transaction processing, fraud prevention and currency issuance. In Bitcoin, each of these processes is reduced to very simple and powerful cryptographic methods that ensure that each step in a chain of steps verifies the next.

In Bitcoin, mining is analogous to a race that occurs every ten minutes where participants all compete to solve a mathematics puzzle. When a solution is found, all transactions (the buys and sells of the system) since the last puzzle was solved are wrapped up into a "block."

Mining is actually verifying and encoding these transactions. A participant who verifies and encodes the transactions receives an award of 25 Bitcoins (generally equal to several hundred dollars).

A hash is a way to compress a long number into something shorter that can be used by a computer, but uniquely identifies the long number. A basic SHA-2 algorithm used in hashing is described in U.S. Pat. No. 6,829,355 to Lilly. Bitcoin mining speeds are measured by the number of hashes that are performed per second, with Megahashes (MH/second), Gigahashes (GH/second) and now Terahashes (TH/second) being common units of measurement.

In mining, the goal is to find a hash that has a sufficient number of zeros at the beginning of the hash. This signifies that the analysis of the block is complete, and the reward is paid from the coinbase, which is an imaginary repository containing all possible Bitcoins.

There exist systems for doing Bitcoin mining. However, as these systems are capable of higher hash speeds, it becomes more difficult to earn a reward with any existing system. Sometimes the rewards must be shared by several winners who collaborated on finding a solution. Further, as hashing speeds are increased, the amount of electricity needed to operate the electronic devices associated with a mining system goes up considerably. The cost of electricity can have a significant impact on the profitability of a mining operation, especially if the award is being shared.

Thus, there is a need for a system that performs hashing at very high speeds. There is also a need for a system that can perform hashing at very high speeds using relatively small amounts of electrical energy.

SUMMARY OF THE DISCLOSURE

In accordance with the disclosed embodiment, there is provided a system for performing hashing that is both fast and energy efficient.

In the disclosed embodiment, the SHA-2 algorithm is completed in 32 pipe stages, evaluating two rounds of the SHA-2 256 algorithm in each pipe stage (32 in stage 1 and 32 in stage 2). Thus, it requires only 32 cycles to complete the first hash, as opposed to the usual 64 cycles. A completely new hash is computed and available for every one (1) additional cycle beyond the 64th cycle, thereby substantially increasing the processing latency and reducing energy consumption.

Advantageously, values or data that can be computed ahead of time are processed and stored for use in the next cycle, thus making them immediately available for use in hashing computations and substantially increasing the processing speed and reducing energy consumption.

Each hash core can compare the hash output to two independent target difficulty levels which allows the ASIC to be usable directly in a pooled mining environment. Pools use this concept to calculate rewards. A share is allocated when the simpler of the two difficulty levels is matched.

In the system, each hash core can be independently controlled, and has an independent initial nonce. This provides complete flexibility regarding how many cores are active in an ASIC as well as how many ASICs are active in a system. The system can decide how to split the nonce range across the cores.

The data expander and SHA 2 compressor of the disclosed embodiments provide additional advantages.

An embodiment is directed to a system for performing hashing including a controller for controlling the system and for providing a clock signal; an array of integrated circuits; in each integrated circuit, a plurality of cores for performing hashing; and in each core, a plurality of data expanders and data compressors, the data expanders and the data compressors having pipelined circuitry so that two iterations of a hashing loop are performed for each cycle of the clock signal.

An embodiment is also directed to a method for performing hashing, including controlling a system having an array of integrated circuits with a clock signal; performing hashing in a plurality of cores in each integrated circuit; and performing for each cycle of the clock signal, in each core, a plurality of data expansion and data compression operations, using pipelined circuitry so that two iterations of a hashing loop are performed for each cycle of the clock signal.

The hashing loop is a for loop. The system and method receive 256 bit data at each clock cycle. Each hash core is independently controlled by the controller. An independent initial nonce is provided to each hash core.

Each hash core compares the hash output to two independent target difficulty levels to allow the system to be used in a pooled mining environment.

Values or data prior to time of use in a next cycle of the clock signal are computed, so that the values or data are available for use in hashing computations, to increase speed and to reduce energy consumption.

The pipelined circuitry comprises a plurality of carry-save-adders and a plurality of carry look ahead adders.

BRIEF DESCRIPTION OF THE DRAWINGS

FIG. 4A to FIG. 4L are timing diagrams, on the same time axis, of signals used for hash core timing in the system of FIG. 1.

FIG. 7B, represent 32 compressors and 31 expanders used to perform hashing in a hash stage of FIG. 6.

A component or a feature that is common to more than one drawing is indicated with the same reference number in each of the drawings.

DESCRIPTION OF THE EMBODIMENTS

Figure 1:
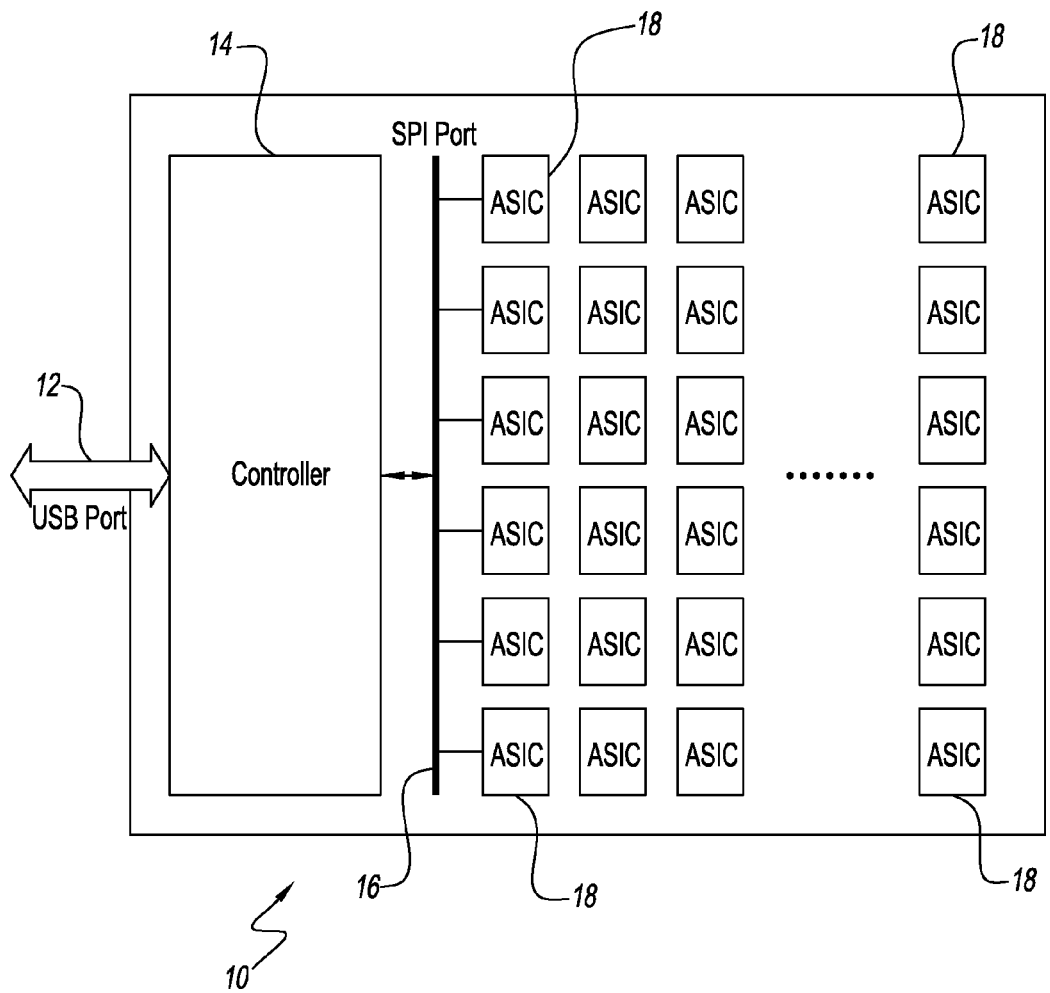
FIG. 1 is a high level block diagram of a system in accordance with a preferred embodiment.

FIG. 1 is a block diagram of system 10 in accordance with the preferred embodiment having a USB port 12 to a controller 14. Controller 14 is connected to a serial peripheral interface (SPI) port 16, which in turn is connected to an array of application specific integrated circuits or ASICs 18. System 10 delivers an unprecedented performance of over 4.608 Tera hashes per second. Performance is derived as follows. There are 80 hash cores per ASIC 18. Each hash core is clocked at 900 MHz. The System 10 has 64 ASICs which provides a performance of 72 Giga Hashes per second*64=4.608 Tera Hashes per second.

A Synopsys design ware serial peripheral interface (SPI) interface block is used for the SPI port 16. The block is called DW_apb_ssi, which is configured as a slave-synchronous serial interface. There is a state machine (not shown) outside the SPI interface that can access the data, control and status information through the Advanced Peripheral Bus (APB) interface. The DMA controller interface is not used. The SPI block is configured in the Motorola SPI mode SPI, which is a four-wire full-duplex serial protocol from Motorola.

Protocol Used

The data structure protocol used is summarized in Table 1 below:

TABLE 1

| Field | Purpose | Updated when . . . | Size (Bytes) |
| --- | --- | --- | --- |
| Version | Block version number | You upgrade the software and it specifies a new version | 4 |
| hashPrevBlock | 256-bit hash of the previous block header | A new block comes in | 32 |
| hashMerkleRoot | 256-bit hash based on all of the transactions in the block | A transaction is accepted | 32 |
| Time | Current timestamp as seconds since 1970-01-01T00:00 UTC | Every few seconds | 4 |
| Bits | Current target in compact format | The difficulty is adjusted | 4 |
| Nonce | 32-bit number (starts at 0) | A hash is tried (increments) | 4 |

The six fields in the above data structure form the block header. The task for ASICs 18 is to constantly hash the block header. The body of the block contains the transactions, which are hashed only indirectly through the MerkleRoot. Bitcoin uses the SHA 256 algorithm Thus, the task is to perform SHA256(SHA256(Block_header)). The header block is 80 bytes long, so with the addition of a SHA 256 PAD, there are two chunks of sixty four bytes to hash. The first chunk stays constant during the mining. The second chunk contains the "Nonce" which increases in a strictly linear way. The nonce starts at 0 and is incremented for each hash. Whenever the nonce overflows, the MerkleRoot is updated, which will generate a new hash from the first chunk of sixty four bytes.

The SPI interface internally uses a frequency that is SCK*10. So if the SCK is 25 MHz, the internal frequency is 250 MHz. The setup time needed is a function of this frequency due to internal synchronizers within the SPI intellectual property (IP).

Figure 2:
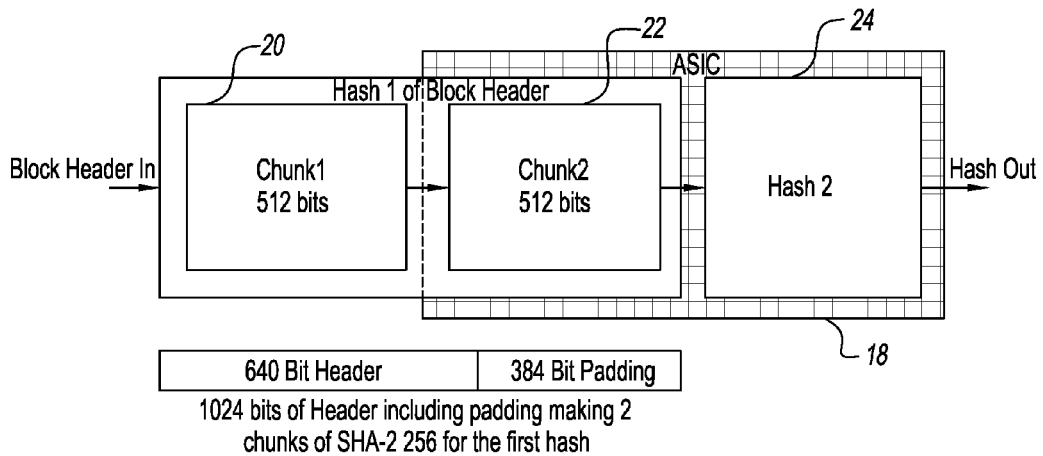
FIG. 2 illustrates partitioning of tasks between software and one of the application specific integrated circuits of FIG. 1.

Referring to FIG. 2, the partitioning of tasks is as follows: The first chunk 20 of 64 bytes is hashed in software. The result, often called the "midstate" is the input to the ASIC 18. ASIC 18 hashes the second chunk 22 and does the second hash repeatedly until the hashed result is below a predefined target. The second hash 24 provides a 256 bit output and needs to have a number of leading zeros. The precise target keeps changing frequently. As shown, 640 bits of header data and 384 bits of padding make up a total of 1024 bits, making up the two chunks of SHA-2 256 for the first hash.

Figure 3:
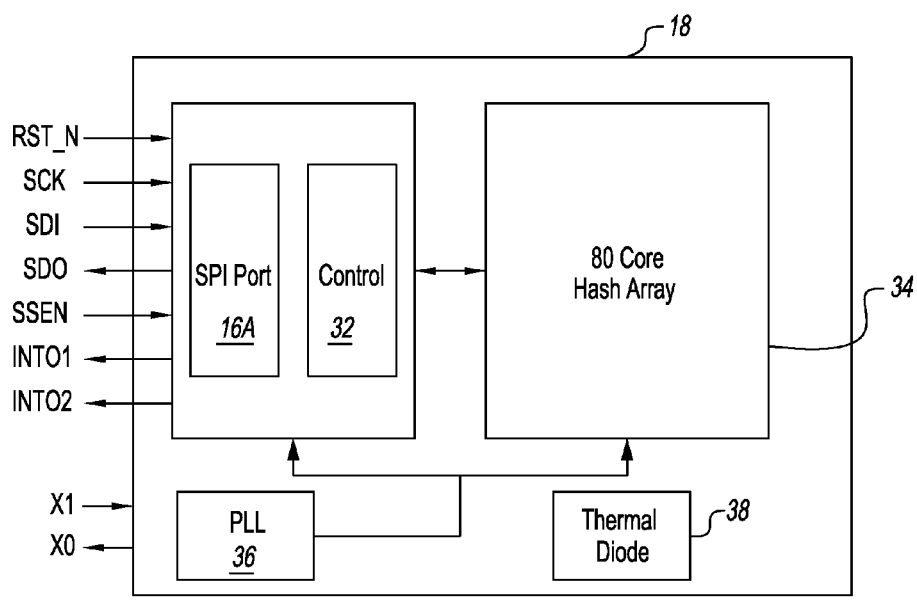
FIG. 3 is a high level block diagram of one of the application specific integrated circuits of FIG. 1.

Referring to FIG. 3, each ASIC 18 has an individual SPI port 16A and a hash control block 32. The control communicates with eighty core hash arrays, as represented by 34. A phased locked loop (PLL) 36 provides signal to keep operations synchronized. A thermal diode 38 provides overheating protection to the ASIC 18.

Figure 4:
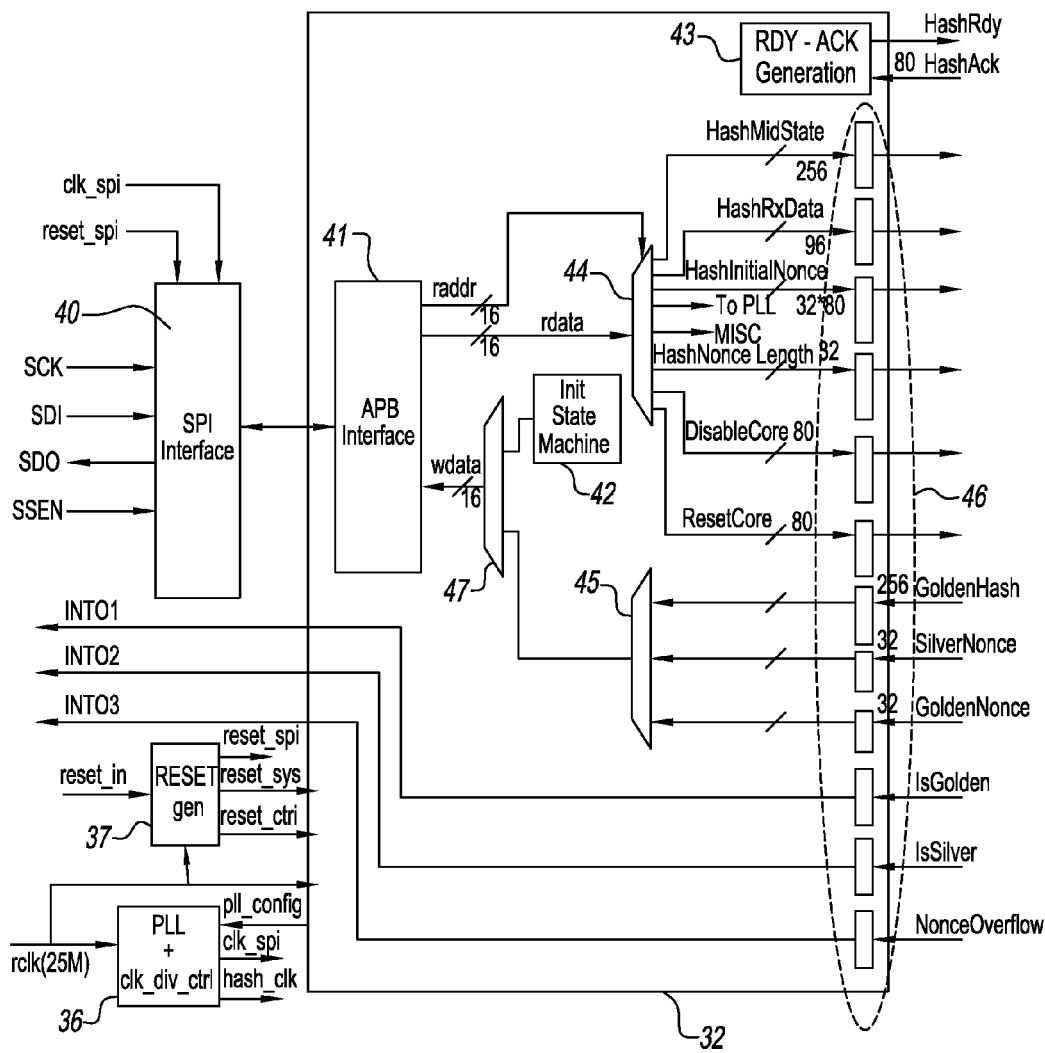
FIG. 4 is a block diagram of a hash control interface in accordance with the system of FIG. 1.

FIG. 4 is a block diagram of a hash control interface. An SPI interface 40 communicates with an advanced peripheral bus (APB) interface 41 in hash control block 32.

The APB interface 41 will have an SPI initialization state machine 42 that runs on reset and executes the following steps:

1. If the DW_apb_ssi is enabled, disable it by writing 0 to SSIENR.
2. Set up the DW_apb_ssi control registers for the transfer. These registers can be set in any order.
   a. Write CTRLR0 (for SPI transfers SCPH and SCPOL must be set identical to the master device).
   b. Write TXFTLR and RXFTLR to set FIFO threshold levels.
   c. Write the IMR register to set up interrupt masks.
3. Enable the DW_apb_ssi by writing 1 to the SSIENR register.
4. Set the mode to Receive only (TMOD=2'b10)

Normally operations are in receive only mode. Modes are switched only when a match has been found and there is something to send.

The device is functionally addressed via SPI interface 40 only. The SPI interface clock should be set to 25 MHz except at power on reset. The same interface is used to read and write all of the registers to control the hash operation. The reference clock is 25 MHz.

Upon power on reset (when signals are received from the reset_gen block 37), the SPI interface 40 should be clocked at most at 2.5 MHz. If the reference clock is operational, the PLL 36 will spin up and generate the required internal clocks based on its default settings. After the power on reset, the SPI interface 40 will initialize and be prepared to receive input from an external controller. Both, the SPI interface 40 settings and PLL 36 settings can be changed once the system is up. The output of the PLL 36 is bypassed at this stage and internal control logic will be running at the reference clock frequency. The master SPI interface (from the external controller) should reconfigure the PLL 36 to generate the desired frequency of operation, such as, for example, 900 MHz. Once the configuration of the PLL 36 has been established, the SPI interface 41 is ready to be operated at 25 MHz.

Each transaction on SPI interface 40 consists of 16 bit address/cmd followed by 16 bits of data. A cmd bit indicates a read or write operation. Through multiplexers 44, 45 and 47 the address selects the appropriate registers 46 to perform read or write operation.

The external system controller is expected to calculate the midstate. In order to set up the hash array, the user should program the input data registers, midstate, initial nonce for each hash core and the nonce length. Finally, the HashStart bit should be written. This will let each ASIC to start mining.

If the entire nonce range is completed, the device will assert the corresponding interrupt. The external controller is expected to service this interrupt and provide new work to the device and restart the hash process.

Golden Nounce.

The term Golden Nonce refers to the nonce that matches the target difficulty for mining a block. The target difficulty is a field in the block header which is changed by the Bitcoin network about every two weeks. It can be increased or decreased based on how fast the new blocks are being created, so that on average, 2016 blocks are found every two weeks.

If any of the hash cores in the ASICs should find a golden match, which is achieved when the hash obtained is strictly less than the target, a corresponding interrupt is asserted. The external controller is expected to service this interrupt and read out the golden nonce and/or hash value. The system software then sends out the proof of work to the Bitcoin network and in this process insert a new block and claims the reward. In addition, the system controller provides new work to the device, which is a new block to be mined. The hash process is again started.

The term Silver Nonce refers to the artificial nonce match that pooled mining systems require miners to use in order to claim a share. This is the technique used by pools to determine how much work each mining rig is actually doing. Since pools have no way of knowing the speed or efficiency of a mining rig connected to their pool, they typically send out a very simple target that even very small systems can use. The Silver target can be as small as but can be larger. An attached miner is expected to send proof of work if a match to this target is obtained. Most such matches do not imply that there is golden match as well, but when a block is actually found, they will both be true.

A powerful system using in accordance with the disclosed embodiment may find a match to the silver target very frequently. If the system software is designed to send back this proof of work, a number of such shares can be claimed for the user. The pools use the proportion of shares reported by each user to determine their rewards. Reference is made to the pool owner's rules to determine how these shares are used.

When a silver match is found, the corresponding interrupt is asserted. The external controller services this interrupt and reads out the silver nonce and/or hash value. The system software then sends out the proof of work to the Bitcoin network. In addition, the system controller provides new work to the system, which is a modified block to be mined. The hash process is again started.

There are a number of options to modify the header block. The specification of miner software can provide the details FIG. 4A to 4L are timing diagram of signals used for hash core timing. The RDY-ACK generation block 43 (FIG. 4) is clocked with the slow Master clock (MCLK of 25 MHz), while each Hash core is clocked by the high speed slave clock (SCLK 900 MHz). The Rdy-Ack is a two-way handshake to transfer data from the hash control block 32 and each hash core 50. A change in the level of the waveform of FIG. 4E from active low to active high, causes the latest values of the waveforms of FIGS. 4I, 4J, 4K and 4L to be registered and transferred to the hash core 50.

The hash control block 32 configures all the hash cores 50 and distributes the initial nonce and nonce length to each core during initialization time. Whenever new work is received from the system, the hash control block writes the data to the hash cores and enables the hash cores.

Figure 5:
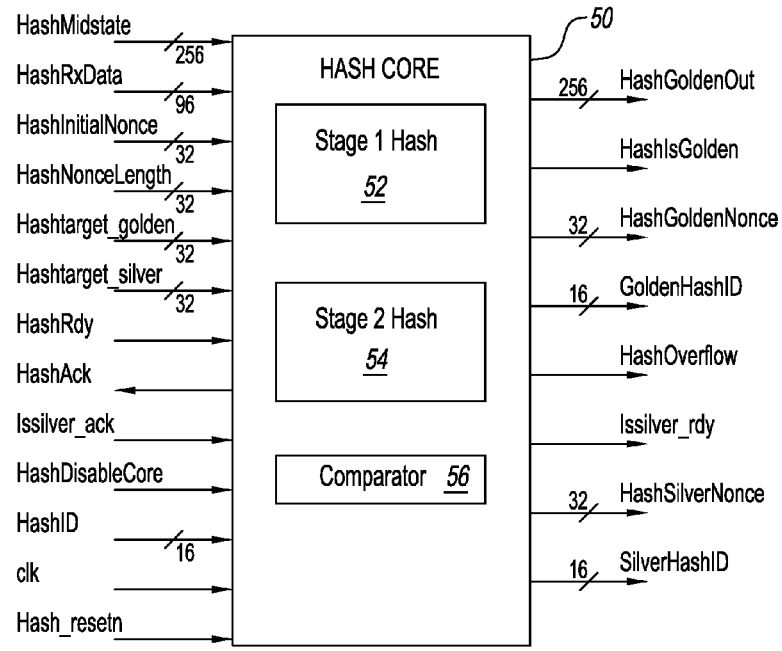
FIG. 5 is a block diagram of a hash core.

FIG. 5 is a block diagram of a single hash core 50. Each core 50 is composed of two iterations of SHA 256 called stage 1 hash 52 and stage 2 hash 54. The algorithm is completed in 32 pipe stages, evaluating two rounds of the SHA 256 in each pipe stage. The core also has a comparator 56 to determine if there is a match. It sets a bit called is_golden, which will be inspected by the config block to determine if a golden nonce should be forwarded to the controller 14.

Definitions relevant to FIG. 5 are:

$Maj(x,y,z) = (x \ \& \ y) | (z \ \& \ (x|y))$ $Ch(x,y,z) = z \ \hat{} \ (x \ \& \ (y \ \hat{} \ z))$ $\Sigma 0(x) = \{x[1:0], x[31:2]\} \ \hat{} \ \{x[12:0], x[31:13]\} \ \hat{} \ \{x[21:0], x[31:22]\}$ $\Sigma 1(x) = \{x[5:0], x[31:6]\} \ \hat{} \ \{x[10:0], x[31:11]\} \ \hat{} \ \{x[24:0], x[31:25]\}$ The notation CSA refers to a Carry-Save-Adder which is a single stage adder with separate sum and carry. CLA refers to a Carry Lookahead adder. Letters A, B, . . . , H refer to the intermediate hash state. Each letter represents 32 bits of the shift register, with A being the least significant 32 bits.

Figure 6:
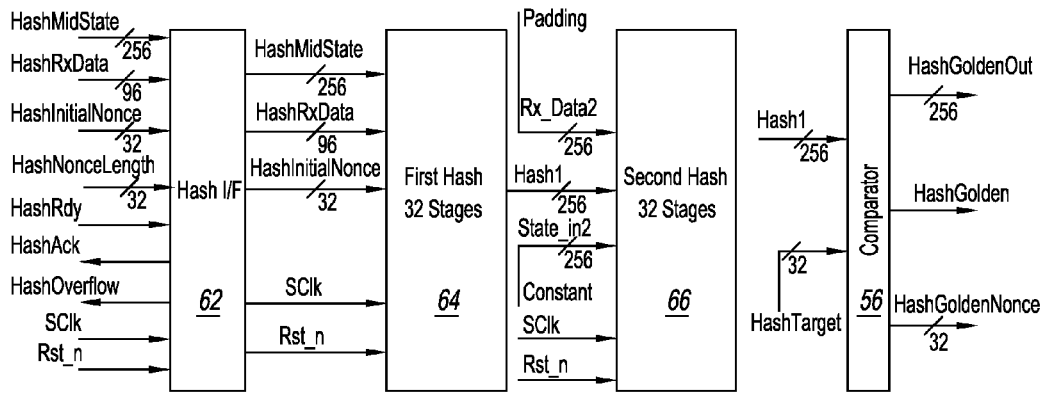
FIG. 6 is a block diagram of a single hash core.

FIG. 6 is a block diagram of a single hash core 60. A single hash core 60 includes a hash interface 62, a first hash block 64, a second hash block 66, and a comparator 56.

Figure 7A:
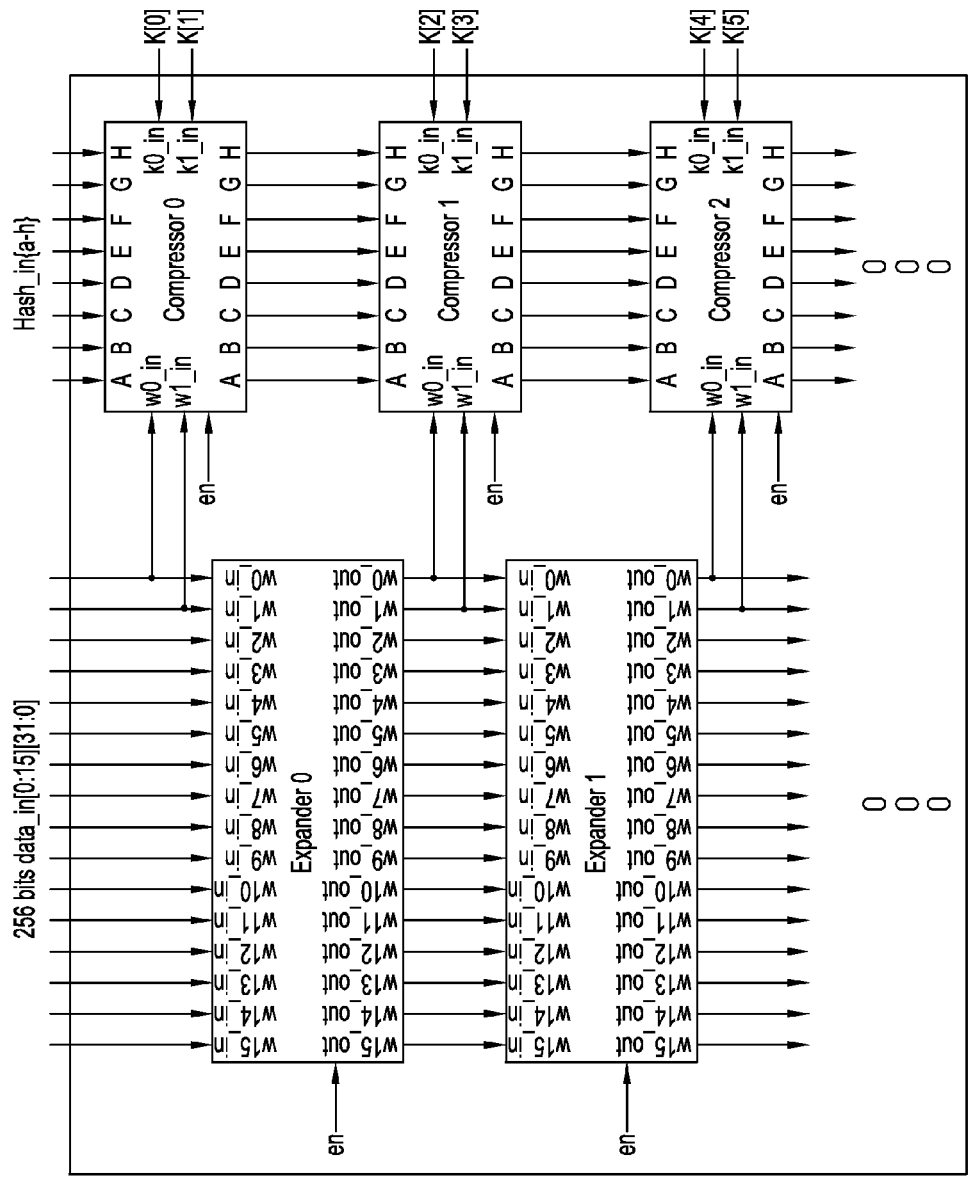
FIG. 7A and FIG. 7B, when assembled with FIG. 7A over
Figure 7B:
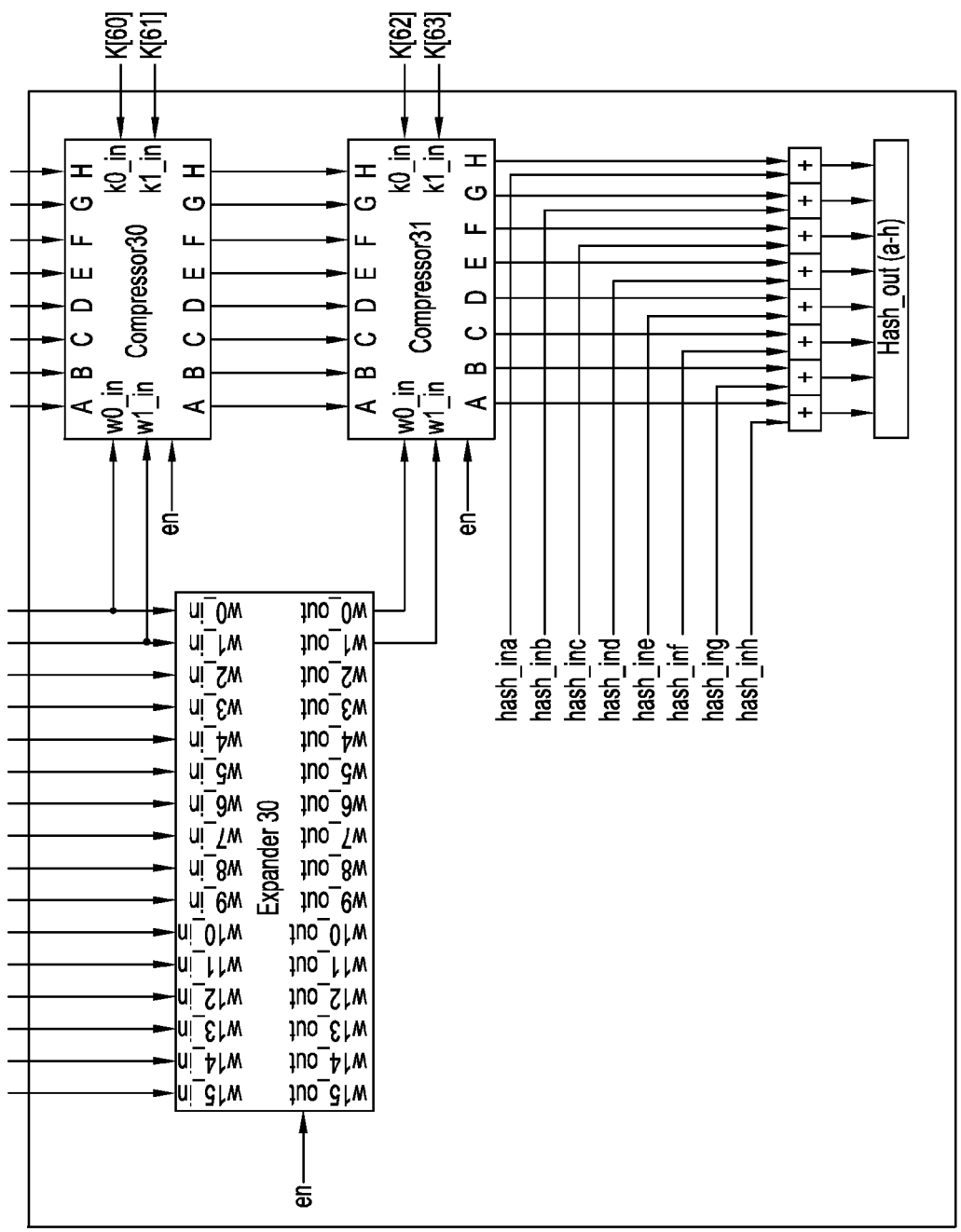

FIG. 7A and FIG. 7B, when assembled with FIG. 7A over FIG. 7B, represent 32 compressors and 31 expanders used to perform hashing in a hash stage of FIG. 6. Thus, FIG. 7A and FIG. 7B illustrate the top level implementation of SHA 256 algorithm. There are two inputs required to hash a 256 bit data: an initial hash value (a to h) and a constant K (1 to 64). Since the algorithm operates on 32 bit words, Input data of 256 bits is divided into 64 words of 32 bits each. Similarly, constant K has 64 values of 32 bits each, going from K0 to K63 and the Initial hash has 8 words (a) to (h) each of 32 bit.

Pseudo code for performing SHA-256 is attached in Appendix A. As mentioned in Appendix A, SHA256 performs two "for loops" to perform hash operations.

The first for loop is an expander having the three expander equations:

for i from 16 to 63 s0:=(w[i−15] rightrotate 7) xor (w[i−15] rightrotate 18; xor (w[i−15] rightshift 3)

s1:=(w[i−2] rightrotate 17) xor (w[i−2] rightrotate 19; xor (w[i−2] rightshift 10)

w[i]:=w[i−16]+s0+w[i−7]+s1

The second 'for loop' as compressor follows the following six compressor equations:
for i from 0 to 63
  S1:=(e rightrotate 6) xor (e rightrotate 11) xor (e rightrotate 25)
    ch:=(e and f) xor ((not e) and g)
    temp1:=h+S1+ch+k[i]+w[i]
    S0:=(a rightrotate 2) xor (a rightrotate 13) xor (a rightrotate 22)
    maj:=(a and b) xor (a and c) xor (b and c)
    temp2:=S0+maj
The result (w[i]) of an expander is taken as input for the $i^{th}$ stage compressor.

In digital hardware a pipelined architecture is implemented. This is achieved with both the above 'for-loops' opened up and replicated sixty four times, and cascaded to each other. Thus, each expander and compressor block will perform one iteration of the 'for-loop' every clock and after sixty four clocks, a final result is produced. Since this is a pipelined architecture, new 256 bit data is fed in at every clock. After the initial sixty four clocks to receive hash output for first input data, each consecutive clock gives out hashed output data for consecutive data input. A significant aspect of the described embodiment is that this is achieved in 32 clocks, by designing the expander and compressor blocks to perform two iterations of the for loop in one clock cycle.

Figure 8:
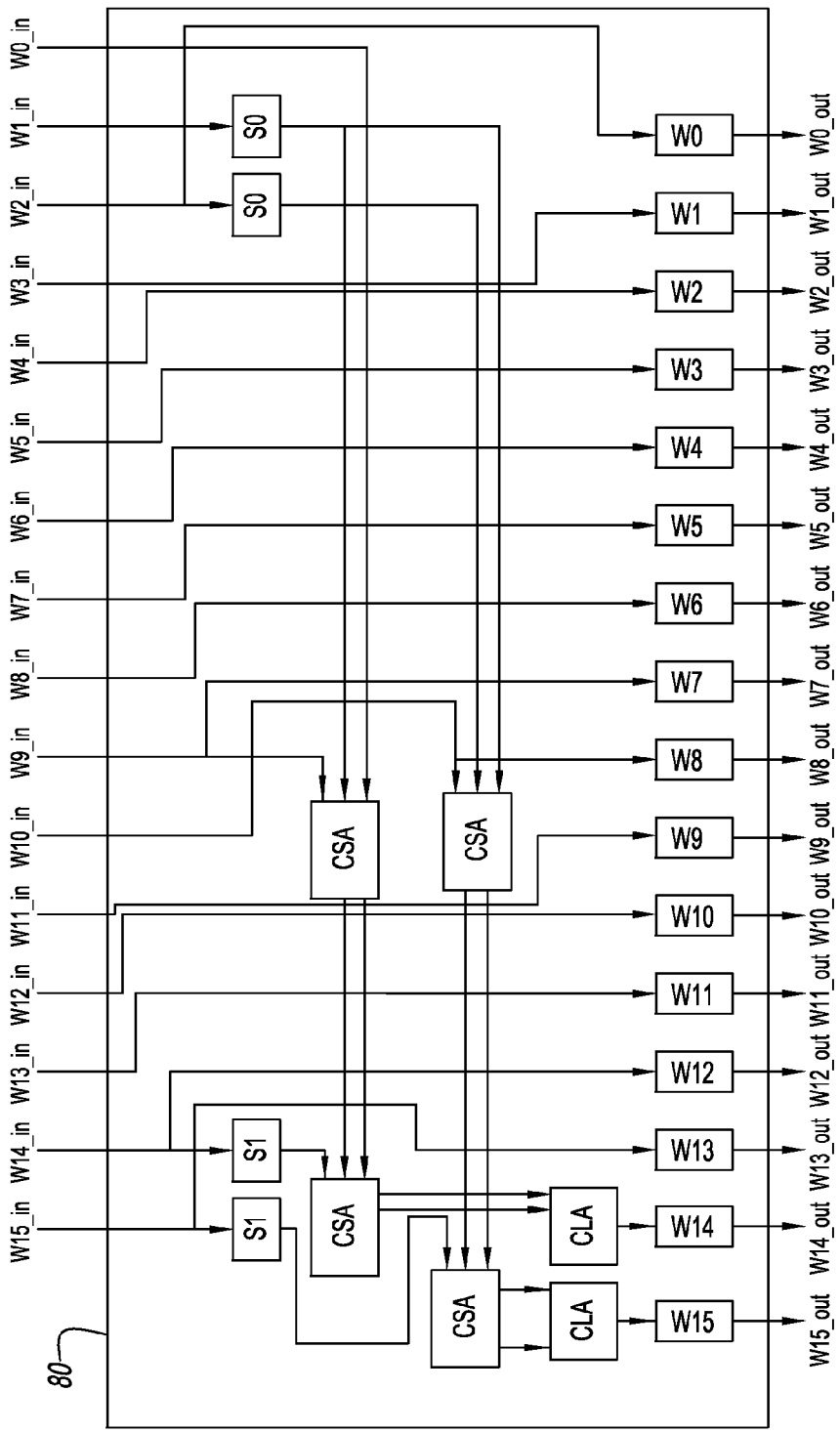
FIG. 8 is block diagram of an expander used in FIG. 7A and FIG. 7B.

FIG. 8 is a block diagram of a data expander shift register pipe 80, and illustrates the connectivity details. Only one of sixty four stages is shown. Each expander block performs two iterations of the above mentioned three expander for-loop equations:

The definitions below explain the expander equations implemented in each of the sub-blocks.
  Definitions:
    S0(x)=ROTR7(x)^ROTR18(x)^A SHR3(x)
    S1(x)=ROTR17(x)^ROTR19(x) ^SHR10(x)
    CSA: Carry Save Adder (3:2 compressor)
    CLA: Carry Lookahead Adder.

As mentioned, w[0] to w[15] are unchanged. These are the same as data_in[0] to data_in[15]. w[16] to w[63] are to be calculated. As can be noted from the third equation above, the values of w[16] to w[63] are dependent on previous values of w. Each expander block performs two iterations of the for loop. Expander 1 will calculate w[16] and w[17]. Expander 2 will calculate w[18] and w[19]. Since two iterations are done in one expander block, there are two instances of S0, S1 and the adders to generate two W_out.

The blocks S0 in FIG. 8 implement the first expander equation shown in the above for loop. The 'Rightrotate' function is achieved by a change in connectivity. For example, (w rightrotate 7)={w[6:0],w1_in[31:7]}. The lower 7 bits of input 32 bit value are connected to the upper 7 bits.

The blocks S1 in the diagram implement the second expander equation shown in the above for loop.

To perform the addition of the third expander equation above, a combination of a CSA and a CLA are used.

The CSA outputs two numbers of the same dimensions as the inputs; one which is a sequence of partial sum bits and another which is a sequence of carry bits.

For example, to perform a binary add of three five bit inputs x, y and z, the binary additions of each bit results in a sum and carry as shown by s and c below. Addition of these two will result in sum of the three numbers. However the final step of adding carry is not done and both sum and carry are provided as outputs of the CSA.

x: 1 0 0 1 1
y: 1 1 0 0 1
z: 0 1 0 1 1
s: 0 0 0 0 1
c: 1 1 0 1 1

The CLA is a full-adder and generates the final sum of all the inputs. It improves speed by reducing the amount of time required to determine carry bits.

Implementation of addition in digital hardware with a combination of CSAs and CLAs is advantageous in places where there are more than three inputs to be added. The last step of generating a carry takes more gates and adds more delay in a digital implementation. Since in the third expander equation above has four inputs, cascading CSAs to CLAs results in a faster and smaller digital binary adder.

Apart from W15 and W14 outputs of each expander block, all other outputs are two location shifted input values. For example, W0 output=w2_in. W1=W3_in . . . , etc.

W0_out and W1_out of the expander block are fed as input to the compressor block. The W0 and W1 outputs of first eight expander blocks are nothing but data_in[15:0][31:0] shifted by two in every expander stage.

The W15 and W14 values calculated in Expander 0 shift by two at each stage and reaches W0 and W1 output of expander 9 to drive inputs of compressor 9.

W0 and W1 outputs of expander 9 to expander 30 drive the calculated values of W shown in the third expander equation of the for loop.

Figure 9:
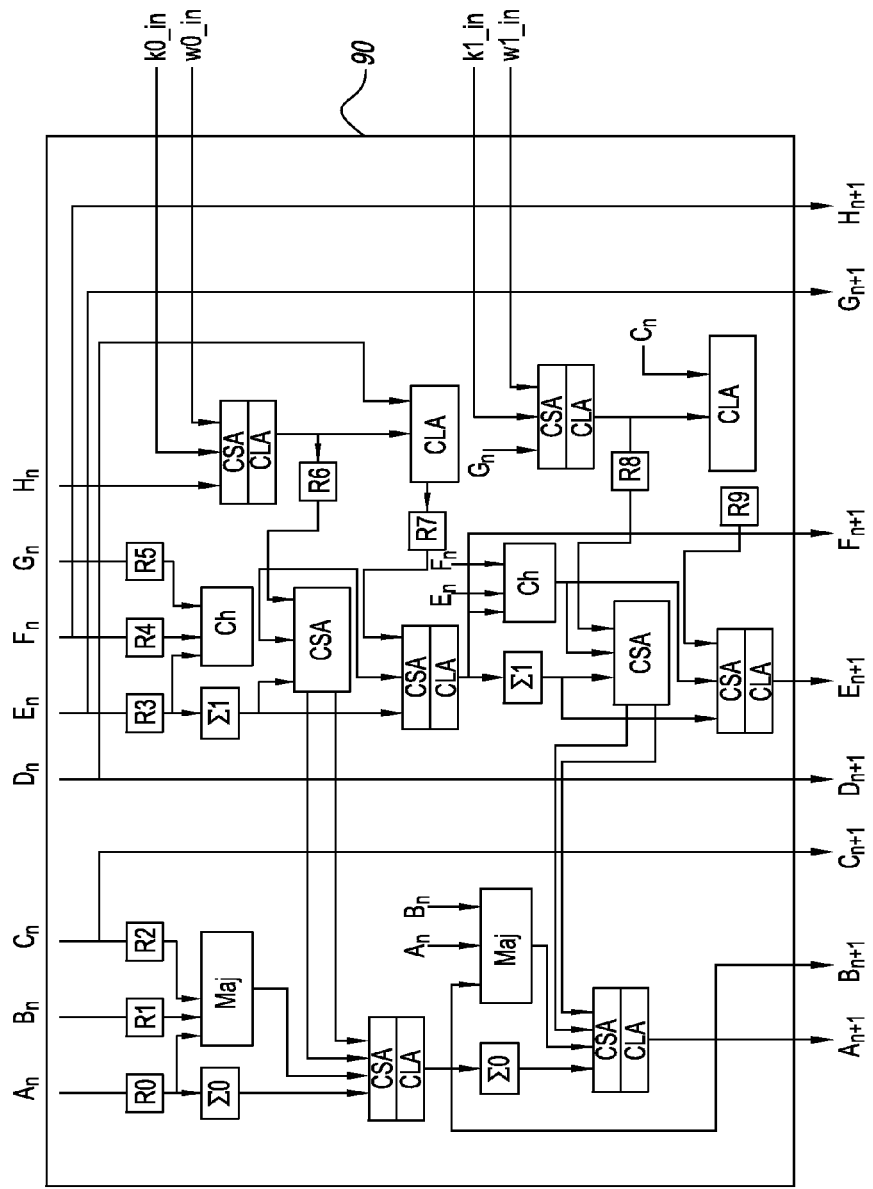
FIG. 9 is block diagram of a compressor used in FIG. 7A and FIG. 7B.

FIG. 9 is a block diagram of SHA 256 compressor block 90 and illustrates the connectivity details. Only one of sixty four stages is shown. Each compressor block performs two iterations of for-loop below. The six abovementioned compressor equations apply, Where:
  h:=g
  g:=f
  f:=e
  e:=d+temp1
  d:=c
  c:=b
  b:=a
  a:=temp1+temp2
Each compressor block 90 receives three inputs:
1. $A_n$ to $H_n$ inputs.
2. K*_in, which is a constant.
3. W*_in from corresponding expander block.

Each compressor block 90 has two instances of S1, ch, S0 and maj as it processes two iterations of the compressor for loop above. The outputs b,c,d, and f,g,h in each iteration are shifted values of input a,b,c and d,e,f. Only the 'a' and 'e' values in each iteration are calculated. Since in hardware implementation each compressor block 90 calculates two iterations of the loop above, the outputs a to h are of the second iteration run. This is a pre-computation of values prior to time of use in a next cycle of the clock signal, so that the values or data are available for use in hashing computations, to increase speed and to reduce energy consumption.

The block S1 in the diagram implements the first compressor equation above. The 'Rightrotate' function is achieved by a change in connectivity. For example, (w rightrotate 7)={w[6:0],w1_in[31:7]}. The lower seven bits of input 32 bit value are connected to the upper seven bits.

The block ch implements the second equation above. The block S0 in FIG. 9 implements the fourth compressor equation above. The block maj implements the fifth compressor equation above.

The CSAs and CLAs adders are used to calculate temp1, temp2, 'e' and 'a'

The advantages and implementation details are the same as those discussed above with respect to the expander.

To exploit the advantages of the CSAs in the hardware implementation, generation of intermediate temp1 and temp2 is avoided.

The equation for 'e' thus becomes the sum of D+h+S1+ch+k[i]+w[i]. The equation for 'a' becomes the sum of h+S1+ch+k[i]+w[i]+S0+maj.

Even with the use of cascaded CSAs and CLAs for the above addition, the equations for 'a' and 'e' result in significant delay. Thus the combinational path for the adders are divided into two clock cycles by the addition of registers R6 and R7 and registers R8 and R9.

The architecture of the expander and compressor blocks provide following advantages:

Two iterations of the compressor and expander loops are implemented in one clock cycle. This effectively generates the final hashed output in 32 clocks cycles.

FLOP requirements for implementing one expander block are reduced to half as compared to 64 cycle implementation.

FLOP requirements for the compressor block are reduced from 16 to 10 as compared to a 64 cycle implementation.

A Reduction in FLOPS, as above, results in a reduced die size requirement. Reduction in FLOPS reduces leakage current, thus saving energy.

Figure 10:
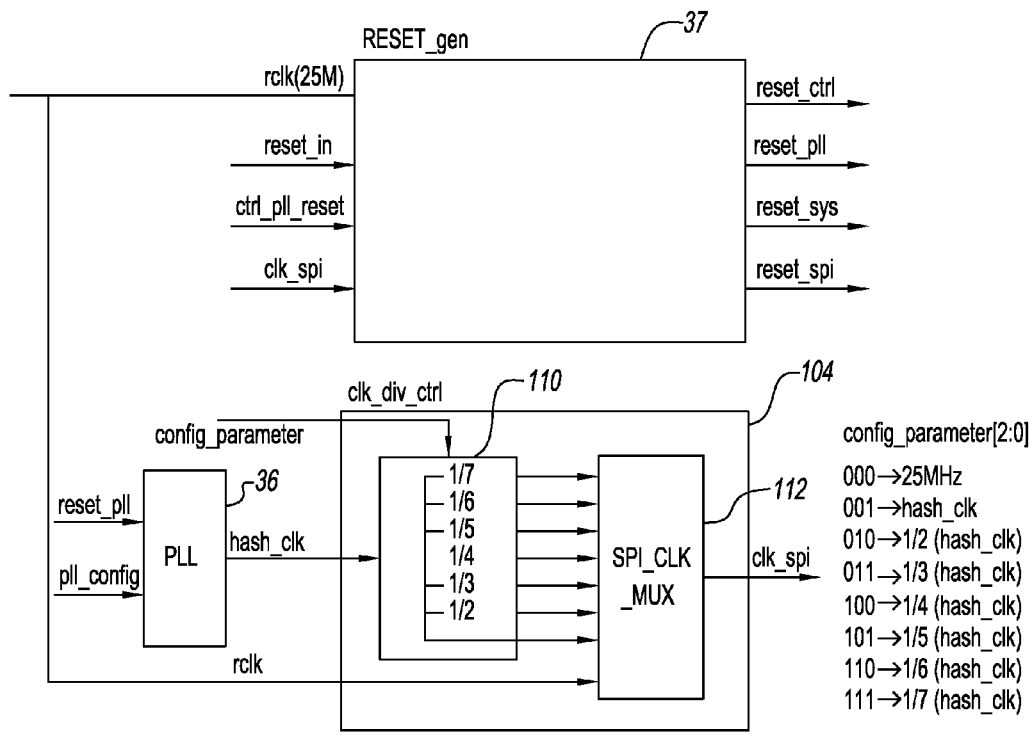
FIG. 10 illustrates the manner of clocking in the system of FIG. 1.

FIG. 10 illustrates the manner of clocking in the system of FIG. 1. In general, a 25 MHz crystal controlled oscillator (not shown) provides a calibrated clock source to the reset_gen block 37 (FIG. 4) and a clk-div-ctrl block 104 of FIG. 10. Reset signals are provided by reset_gen block 102, which provides the signals reset_ctrl, reset_pll, reset_sys and reset_spi. PLL 36 has as inputs reset_pll and pll_config. PLL 36 provides as its output hash clk, which is provided to frequency divider block 110. The various outputs of block 110 are provided to a multiplexer 112 (SPI_CLK_MUX) so that one of the outputs of frequency block 110 or the 25 MHz clock are provided as a clk_spi signal, in accordance with the config_parameter input to block 110.

If the output of PLL 36 needs to be changed from its default value, the following sequence should be observed: Write appropriate values to PLL config 0 register and PLL config 1 register. The last write should be to set the update_pll bit. This causes an internal state machine to start the PLL reconfiguration process. At the end of this, the PLL will get the newly configured inputs and will generate the new clock as shown in the examples in Table 1.

TABLE 1

Example PLL Configuration values:

| PLL output (in GHz) | CLKF[5:0] With ref_clk = 25 MHz |
|---|---|
| 0.8 | 01_1111 |
| 0.9 | 10_0011 |
| 1.0 | 10_0111 |
| 1.1 | 10_1011 |
| 1.2 | 10_1111 |
| 1.3 | 11_0011 |
| 1.4 | 11_0111 |
| 1.5 | 11_1011 |
| 1.6 | 11_1111 |

BWADJ = CLKF
CLKR = CLKOD = 4'b0

The following Table 2 shows the SPI_CLK_SEL divider settings.

TABLE 2

SPI_CLK_SEL Divider Settings

| SPI_CLK_SEL[9:6] | SPI I/f Clk output | Duty cycle (%) |
|---|---|---|
| 000 | 25 MHz | 50 |
| 001 | (PLL output) | 50 |
| 010 | ½ (PLL output) | 50 |
| 011 | ⅓ (PLL output) | 30 |
| 100 | ¼ (PLL output) | 50 |
| 101 | ⅕ (PLL output) | 60 |
| 110 | ⅙ (PLL output) | 50 |
| 111 | ⅐ (PLL output) | 57 |

Each transaction on the SPI interface consists of either a read or a write. Each Write transaction is 32 SPI cycles long and consists of an address phase followed by a data phase. The upper most bit of the address is a 1-bit command (0—Write). The address phase and data phase is each 16 bits long.

Interrupt Processing

The ASICs 18 are designed with three interrupts—INTO1, INTO2 and INTO3. All three interrupts are active high, level-sensitive interrupts which stay asserted until they are serviced. For interrupts INTO1 and INTO2, the external controller should read the corresponding outputs—gold nonce and gold ID for INTO1, and silver nonce and silver ID for INTO2. Reading any one of the three registers (2 for nonce and 1 for ID) will clear the interrupt. INTO3 is asserted whenever the device is ready to accept more work. It remains asserted until no more space is available for work IDs. At most, three work ID's can be active within the device. The interrupt is cleared only when the buffer is full.

The hash core has a slave only interface which is asynchronous in order to support a slow master and fast slaves. It is based on the Rdy-Ack protocol, which as discussed above, is a two-way handshake. The hash control block initializes each hash core after reset with its own starting nonce and nonce_length. It also assigns work to each Hash core whenever new work is available.

Reference Clock Input

The ASICs 18 accept a 25 MHz reference clock from either a low-cost crystal (parallel resonance, operating in fundamental mode) or a single-ended clock source such as a ±30 ppm self-contained or buffered system clock. The crystal (not shown) should be located as close as possible to the ASIC 18, to minimize printed circuit board stray capacitance. Crystals cut for a load capacitance of 18 pF are recommended. Approximate load capacitance value derived will be CL=(C1×C2)/(C1+C2)+CS, where C1 and C2 are the actual load capacitors which are connected to the pins of the crystal and CS is the sum of stray capacitance at the input pin. With load capacitance of 22 pF and stray capacitance of 10 pF, the total load capacitance across the crystal will be 22 pF. The 22 pF capacitor value can be adjusted slightly to account for variance in crystal specifications or parasitic capacitance. A single stage low jitter buffer can be used to distribute the clock to multiple chips. Sufficient bypass capacitors of values 10 uF and 0.1 uF placed close to the power pins of buffer should be used.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Appendix A (SHA256 Pseudo code)

Note 1: All variables are 32 bit unsigned integers and addition is calculated modulo 2$^{32}$ Note 2: For each round, there is one round constant k[i] and one entry in the message schedule array w[i], 0≤i≤63

Note 3: The compression function uses 8 working variables, a through h

Note 4: Big-endian convention is used when expressing the constants in this pseudocode, and when parsing message block data from bytes to words, for example, the first word of the input message "abc" after padding is 0x61626380

Initialize hash values: (first 32 bits of the fractional parts of the square roots of the first 8 primes 2 . . . 19):
h0:=0x6a09e667
h1:=0xbb67ae85
h2:=0x3c6ef372
h3:=0xa54ff53a
h4:=0x510e527f
h5:=0x9b05688c
h6:=0x1f83d9ab
h7:=0x5be0cd19

Initialize array of round constants: (first 32 bits of the fractional parts of the cube roots of the first 64 primes 2 . . . 311):
k[0 . . . 63]:=0x428a2f98, 0x71374491, 0xb5c0fbcf, 0xe9b5dba5, 0x3956c25b, 0x59f111f1, 0x923f82a4, 0xab1c5ed5, 0xd807aa98, x12835b01, 0x243185be, 0x550c7dc3, 0x72be5d74, 0x80deb1fe, 0x9bdc06a7, xc19bf174, 0xe49b69c1, 0xefbe4786, 0x0fc19dc6, 0x240calcc, 0x2de92c6f, x4a7484aa, 0x5cb0a9dc, 0x76f988da, 0x983e5152, 0xa831c66d, 0xb00327c8, 0xbf597fc7, 0xc6e00bf3, 0xd5a79147, 0x06ca6351, 0x14292967, 0x27b70a85, 0x2e1b2138, 0x4d2c6dfc, 0x53380d13, 0x650a7354, 0x766a0abb, 0x81c2c92e, 0x92722c85, 0xa2bfe8a1, 0xa81a664b, 0xc24b8b70, 0xc76c51a3, 0xd192e819, 0xd6990624, 0xf40e3585, 0x106aa070, 0x19a4c116, 0x1e376c08, 0x2748774c, 0x34b0bcb5, 0x391c0cb3, 0x4ed8aa4a, 0x5b9cca4f, 0x682e6ff3, 0x748f82ee, x78a5636f, 0x84c87814, 0x8cc70208, 0x90befffa, 0xa4506ceb, 0xbef9a3f7, 0xc67178f2

Perform Pre-processing using the following steps:
append the bit '1' to the message.
append k bits '0', where k is the minimum number>=0 such that the resulting message length (modulo 512 in bits) is 448.
append length of message (without the '1' bit or padding), in bits, as 64-bit big-endian integer (this will make the entire post-processed length a multiple of 512 bits).

Process the message in successive 512-bit chunks:
break message into 512-bit chunks. For each chunk create a 64-entry message schedule array w[0 . . . 63] of 32-bit words (The initial values in w[0 . . . 63] don't matter, so many implementations zero them here). Copy chunk into first 16 words w[0 . . . 15] of the message schedule array.

Extend the first 16 words into the remaining 48 words w[16 . . . 63] of the message schedule array:
for i from 16 to 63:
s0:=(w[i−15] rightrotate 7) xor (w[i−15] rightrotate 18) xor (w[i−15] rightshift 3)
s1:=(w[i−2] rightrotate 17) xor (w[i−2] rightrotate 19) xor (w[i−2] rightshift 10)
w[i]:=w[i−16]+s0+w[i−7]+s1

Initialize Working Variables to Current Hash Value:
a:=h0
b:=h1
c:=h2
d:=h3
e:=h4
f:=h5
g:=h6
h:=h7

Compression Function Main Loop:
for i from 0 to 63
S1:=(e rightrotate 6) xor (e rightrotate 11) xor (e rightrotate 25)
ch:=(e and f) xor ((not e) and g)
temp1:=h+S1+ch+k[i]+w[i]
S0:=(a rightrotate 2) xor (a rightrotate 13) xor (a rightrotate 22)
maj:=(a and b) xor (a and c) xor (b and c)
temp2:=S0+maj
    h:=g
    g:=f
    f:=e
    e:=d+temp1
    d:=c
    c:=b
    b:=a
    a:=temp1+temp2

Add the compressed chunk to the current hash value:
h0:=h0+a
h1:=h1+b
h2:=h2+c
h3:=h3+d
h4:=h4+e
h5:=h5+f
h6:=h6+g
h7:=h7+h Produce the final hash value (big-endian):
digest:=hash:=h0 append h1 append h2 append h3 append h4 append h5 append h6 append h7.

What is claimed is:
1. A system for performing hashing, comprising:
a controller for controlling the system and for providing a clock signal;
an array of integrated circuits;
in each integrated circuit, a plurality of hash cores for performing hashing; and in each hash core, thirty one data expanders and thirty-two data compressors, the data expanders and the data compressors having pipelined circuitry so that two iterations of a hashing loop are performed for each cycle of the clock signal, wherein there are sixteen registers in a data expander, and ten registers in a data compressor;

whereby required die size for the hash cores is reduced, leakage current is reduced and energy is saved; and circuitry for processing and computing values or data prior to time of use in a next cycle of the clock signal, so that the values or data are available for use in hashing computations, to increase speed and to reducing energy consumption.

2. The system of claim 1, wherein a hashing loop is a for loop.

3. The system of claim 1, configured to receive 256 bit data at each clock cycle.

4. The system of claim 1, wherein each hash core is independently controlled by the controller.

5. The system of claim 1, further comprising circuitry for providing an independent initial nonce to each hash core.

6. The system of claim 1, wherein each hash core compares the hash output to two independent target difficulty levels to allow the system to be used in a pooled mining environment.

7. The system of claim 1, wherein the hashing is performed using an SHA-2 algorithm.

8. The system of claim 7, including circuitry for completing the SHA-2 algorithm in thirty two pipe stages, and wherein two rounds of the SHA-2 256 algorithm are completed in each pipe stage.

9. The system of claim 1, wherein the pipelined circuitry comprises a plurality of carry-save-adders and a plurality of carry look ahead adders.

10. A method for performing hashing, comprising:

controlling a system having an array of integrated circuits with a clock signal;

performing hashing in a plurality of hash cores in each integrated circuit;

performing for each cycle of the clock signal, in each hash core, a plurality of data expansion and data compression operations, using thirty one data expanders, thirty two data compressors and pipelined circuitry so that two iterations of a hashing loop are performed for each cycle of the clock signal, wherein sixteen registers in a data expander, and ten registers in a data compressor are used;

whereby required die size for the hash cores is reduced, leakage current is reduced and energy is saved; and processing and computing values or data prior to time of use in a next cycle of the clock signal, so that the values or data are available for use in hashing computations, to increase speed and to reducing energy consumption.

11. The method of claim 10, wherein the hashing loop is a for loop.

12. The method of claim 10, further comprising receiving 256 bit data at each clock cycle.

13. The method of claim 10, further comprising the controller independently controlling each hash core.

14. The method of claim 10, further comprising providing an independent initial nonce to each hash core.

15. The method of claim 10, further comprising: comparing, in each hash core, hash output to two independent target difficulty levels to allow the method to be used in a pooled mining environment.

16. The method of claim 10, wherein the hashing is performed using an SHA-2 algorithm.

17. The method of claim 16, comprising completing the SHA-2 algorithm in thirty two pipe stages, and wherein two rounds of the SHA-2 256 algorithm are completed in each pipe stage.

18. The method of claim 10, further comprising using pipelined circuitry that comprises a plurality of carry-save-adders and a plurality of carry look ahead adders.

* * * * *